United States Patent
Chism, Jr. et al.

(10) Patent No.: US 6,781,087 B1
(45) Date of Patent: Aug. 24, 2004

(54) THREE-PHASE PLASMA GENERATOR HAVING ADJUSTABLE ELECTRODES

(75) Inventors: Paul E. Chism, Jr., Decatur, AL (US); Philip G. Rutberg, St. Petersburg (RU); Alexei A. Safronov, St. Petersburg (RU); Vasili N. Shiriaev, St. Petersburg (RU)

(73) Assignee: Scientific Utilization, Inc., Huntsville, AL (US)

( * ) Notice: Subject to any disclaimer, the term of this patent is extended or adjusted under 35 U.S.C. 154(b) by 0 days.

(21) Appl. No.: 10/181,511

(22) PCT Filed: Jan. 18, 2000

(86) PCT No.: PCT/US00/01123

§ 371 (c)(1),
(2), (4) Date: Jul. 18, 2003

(87) PCT Pub. No.: WO01/54464

PCT Pub. Date: Jul. 26, 2001

(51) Int. Cl.$^7$ ................................................ B23K 9/00
(52) U.S. Cl. .......................... 219/121.48; 219/121.49; 219/121.51; 219/121.52; 219/121.56
(58) Field of Search ....................... 219/121.11, 121.36, 219/121.48, 121.49, 121.51, 121.52, 121.54, 121.55, 121.56, 137 PS; 315/111.21; 373/18

(56) References Cited

U.S. PATENT DOCUMENTS

| | | | |
|---|---|---|---|
| 3,248,513 A | 4/1966 | Sunnen | 219/76 |
| 3,849,584 A | 11/1974 | Paton et al. | 13/9 |
| 3,869,593 A | 3/1975 | New et al. | 219/121 |
| 3,894,573 A | 7/1975 | Paton et al. | 164/52 |
| 4,009,413 A | 2/1977 | Elliott et al. | 315/111.2 |
| 4,013,867 A | 3/1977 | Fey | 219/121 |
| 4,034,250 A | 7/1977 | Kiselev et al. | 313/32 |
| 4,361,441 A | 11/1982 | Tylko | 75/10 |
| 4,761,618 A | 8/1988 | Patron et al. | 331/167 |
| 4,788,408 A | 11/1988 | Wlodarczyk et al. | 219/121.49 |
| 4,818,836 A | 4/1989 | Bebber et al. | 219/121.54 |
| 5,166,494 A | 11/1992 | Luo et al. | 219/121.55 |
| 5,801,489 A | 9/1998 | Chism, Jr. et al. | 315/111.21 |
| 6,172,333 B1 * | 1/2001 | Stava | 219/137 PS |

FOREIGN PATENT DOCUMENTS

| | | |
|---|---|---|
| DE | 1 901 349 | 7/1970 |
| EP | 0 621 667 | 10/1994 |
| GB | 1 380 719 | 1/1975 |

OTHER PUBLICATIONS

Kiselev et al., *Teplofizika Vysokikh Temperatur.* Leningrad. Jul.–Aug. 1974, vol. 12, No. 4, pp. 827–837. (reprinted translation Plenum Publishing Corporation, 1975).

* cited by examiner

*Primary Examiner*—Tu Hoang
(74) *Attorney, Agent, or Firm*—Waddey & Patterson; Larry W. Brantley; Emily A. Shouse

(57) ABSTRACT

Three adjustable electrodes (33a–33c) within a chamber (40) form a thermal plasma generating system (30). The electrodes (33a–33c) are positioned with a narrow gap at one portion and a wide gap at another portion to form a cone shape. The gap between the electrodes is adjusted to accommodate for wear on the electrodes (33a–33c). An electric arc is initiated at the narrowest point between two electrodes which moves over the length of the electrodes because of a magnetic field created by the arc and the forward motion of the injected stream. At the end of the electrodes, the arc is extinguished and another arc is initiated. The continuous arc moving along the electrodes ionizes a working stream that is tangentially injected from three pneumatic rings (35a–35c) which provide improved mixing of the working stream for high quality thermal plasma. The thermal plasma exits through a narrow orifice (42).

34 Claims, 5 Drawing Sheets

THREE-PHASE PLASMA GENERATOR HAVING ADJUSTABLE ELECTRODES

TECHNICAL FIELD

The present invention relates generally to Alternating Current (AC) thermal plasma generators. More particularly, this invention pertains to three-phase, AC thermal plasma generators.

BACKGROUND ART

Thermal plasma is generally defined as a state of matter, which exhibits many properties similar to gas, contains substantially equal numbers of positive and negative ions and radicals, and is a good conductor of electricity. Thermal plasma may be created by increasing the internal energy of matter. The internal energy of matter may be increased by exposing matter to an electric arc in such a way that the electrical energy from the electric arc is transferred to the matter.

Different techniques for generating thermal plasma have been researched for many years. As a result, several different types of thermal plasma generation systems have been developed. One such example is the thermal plasma, metal cutting, torch. Each system differs in the way that the electric arc is initiated and sustained.

Thermal plasma has been created using both direct current and alternating current devices. Low power direct current (DC) and inductive coupling (IC) thermal plasma generators are currently used in semiconductor, film deposition, and other high technical applications. Alternating current (AC) thermal plasma generators are ideal for such applications as radioactive materials vitrification, decontamination of pathogenic materials and substances (e.g., hospital waste), and reduction and/or safe decomposition of hazardous waste or difficult to destroy materials. In addition, AC thermal plasma generators may be used in chemical processes that require the heating of materials in the absence of oxygen or to reduce or de-compose waste materials into clean energy fuel.

In all DC arc-generating systems, the arc is initiated between a cathode and an anode. In a transferred arc system, a substance being treated, a molten metal for example, is used as one of the electrodes. In a non-transferred arc system, the electrodes are independent of the treated substance.

AC thermal plasma generators are more efficient and less expensive than DC thermal plasma generators because complicated and expensive rectifier equipment is not necessary. However, AC thermal plasma generators have disadvantages as well.

Single-phase AC thermal plasma generators have been found to be inherently unstable due to the fact that the electric arc is extinguished every half cycle. As a result, the electric arc must be initiated 120 times per second. Three-phase AC thermal plasma generators overcome this instability problem.

A three-phase AC thermal plasma generator is described in U.S. Pat. No. 5,801,489 commonly owned by Applicant. This thermal plasma generator is powered by alternating current directly from a conventional electric utility network or from a generator system. The use of alternating current provides a significant improvement in efficiency over prior art DC plasma generators. In addition, this generator uses a three-phase electrode arrangement to produce a stable arc. This arrangement results in a highly stable arc thereby overcoming the instability found in other prior art AC thermal plasma generators.

One disadvantage of the '489 patent is the short lifetime of the primary electrodes. The primary electrode arrangement in the '489 patent provides small arc-working areas on each primary electrode. As a result, the primary electrodes wear out in a short time period and must be replaced. This is a time-consuming and expensive process.

Another disadvantage of the '489 patent is the fact that the primary electrodes are fixed in place. As the primary electrodes wear down due to the small arc-working areas on each electrode, the gap between the primary electrodes increases. As the gap increases, the voltage necessary to initiate an arc across the gap increases and generator efficiency is reduced.

Still another disadvantage of the '489 patent is the use of a single pneumatic ring, located adjacent to the primary electrodes, to introduce the working stream into the arcing chamber. As a result, a non-uniform thermal plasma steam is produced, having hot and cold spots, which reduces generator efficiency.

What is needed, then, is an improved three-phase AC thermal plasma generator having an adjustable primary electrode arrangement that results in a substantially constant gap between primary electrodes and large arc-working areas, which increases generator efficiency, extends the life of electrodes, and reduces primary electrode replacement costs. Additionally, what is needed is a means of introducing the working stream into the arcing chamber that results in uniform thermal plasma generation to further increase generator efficiency.

DISCLOSURE OF THE INVENTION

The thermal plasma generator of this invention is powered with alternating current directly from a conventional electric utility network or from a generator system. A significant improvement in efficiency over DC generators is obtained by using alternating current because of reduced losses that would otherwise occur in the power supply. In addition, the process of convective heat-exchange takes place because of the rapid movement of the arcs within the chamber, high turbulence stream flow, and diffusion of the arc inside the chamber. The use of relatively low voltage alternating current eliminates the need for an additional high-voltage direct current power supply thus reducing the cost of fabrication and maintenance.

The primary electrodes are positioned so that a portion of each electrode forms a narrow gap with respect to a portion of each of the other two electrodes, and another portion of each electrode forms a wider gap with respect to another portion of each of the other two electrodes. This configuration results in a larger electrode arc-working area and extends the life of the electrodes.

The use of electrodes configured to provide a large arc-working area and the application of the rail gun effect (the movement of the arc under the influence of its own magnetic field) allows the use of electrodes cooled by water with the operational advantage of several hundreds of hours without maintenance. Two types of electrodes can be used: tubular water-cooled electrodes made of copper and rod electrodes made of tungsten alloy and cooled with stream.

In accordance with one object of the invention, the plasma generator of the present invention utilizes a novel adjustable arrangement and configuration of electrodes that provides a large arc-working area and redistributes thermal load on the electrodes by rapidly moving the arc along the electrodes.

The large arc-working area and redistribution extends the life of the electrode. The adjustment mechanism ensures that the gap between each electrode remains constant and, as a result, maintains generator efficiency.

In accordance with another object of the invention, a high quality, uniform plasma is obtained by injecting the working stream into the arcing chamber of the generator through multiple stream rings. The use of multiple rings improves the mixing of the working stream.

BEST MODE FOR CARRYING OUT THE INVENTION

Figure 1:
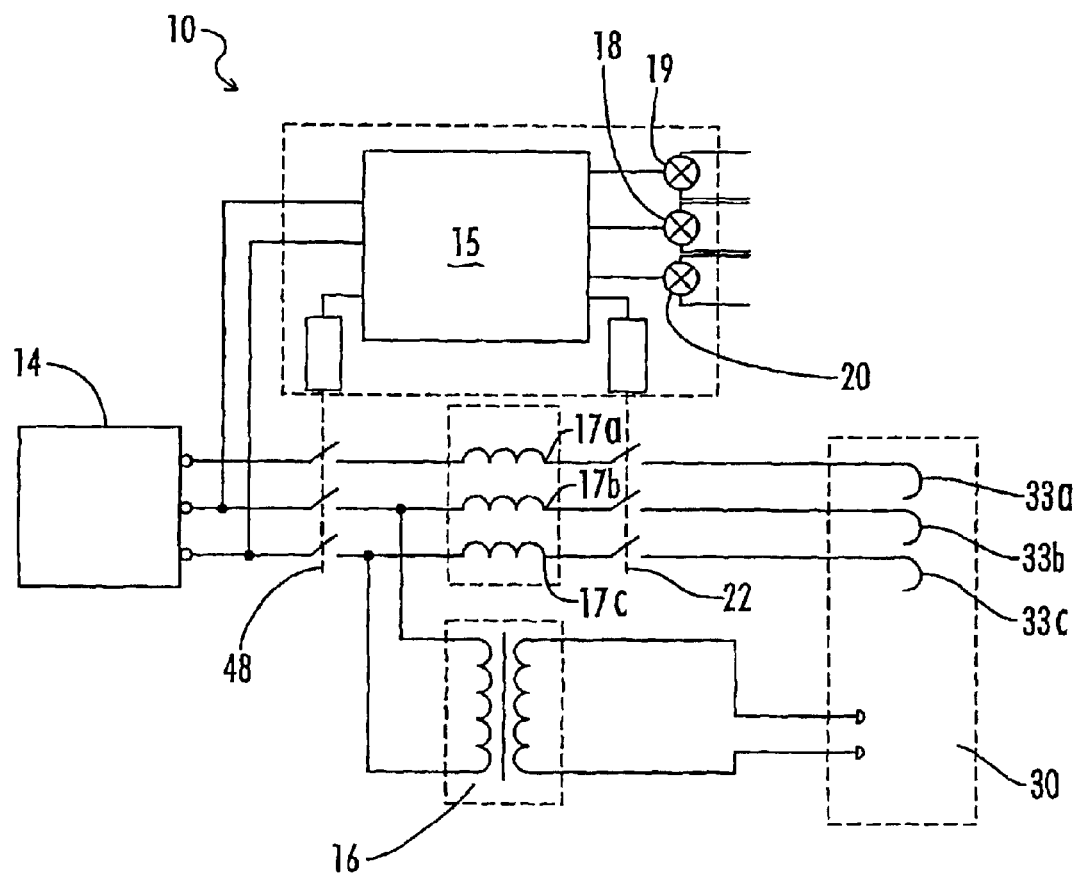
FIG. 1 is a block schematic diagram that generally shows the electrical and stream interconnections among the various components of the system

The general arrangement of the primary components of the plasma generator system 10, and their interconnection, is shown in FIG. 1. Referring to FIG. 1, the plasma generator system 10 comprises six major components: a plasma generator 30, an injector stream manifold 19, a working stream manifold 18, a cooling stream manifold 20, control circuits 15, and an electric power supply 14. Some of these components, such as the control circuits 15, are enclosed in steel cabinets (not shown).

Figure 2:
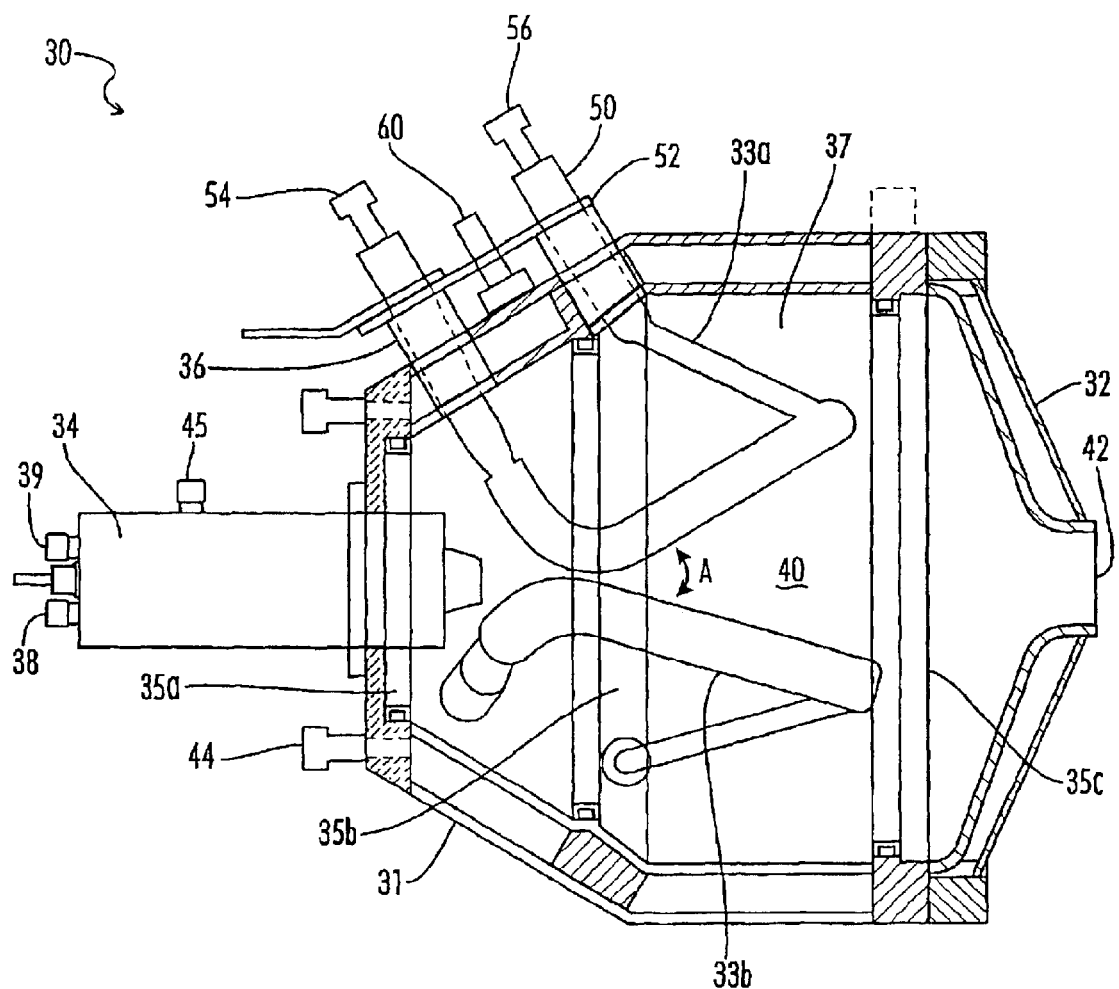
FIG. 2 is a cutaway side view of a preferred mechanical-embodiment of the plasma generator of the present invention.

As seen in FIG. 2, the thermal plasma generator 30 includes a housing 31 in which are mounted the operative components. High voltage operating power for an injector 34 is fed from the secondary of injector high power transformer 16 (KG. 1) to first and second injector electrode terminals 38 and 39 on injector 34 which passes through an end wall of the housing 31. The primary side of injector transformer 16 is connected through an automatic power switch 48 (FIG. 1) across one phase of a 3-phase 480 VAC power network. The 3-phase 480 VAC power network is represented by the electric power supply 14 illustrated in FIG. 1.

The thermal plasma generator housing 31 is actually a shell with an internal stream jacket to provide for stream cooling. Thus, a faceplate 32 is attached to housing 31 by a spacer ring 37 to form an interior arcing chamber 40 which contains the primary arcs. A circular opening 42 is formed in the center of the faceplate 32 from which the thermal plasma stream is exhausted from within chamber 40. Faceplate 32 and spacer ring 37 also have stream jackets in their respective outside walls for cooling purposes. Accordingly, brass tubes having an axial orientation are arranged peripherally around the mating surfaces of faceplate 32 and spacer ring 37 to provide passages between the jackets of housing 31, faceplate 32, and spacer ring 37. Cooling stream enters the jacket system through housing cooling water hose 44.

Figure 3:
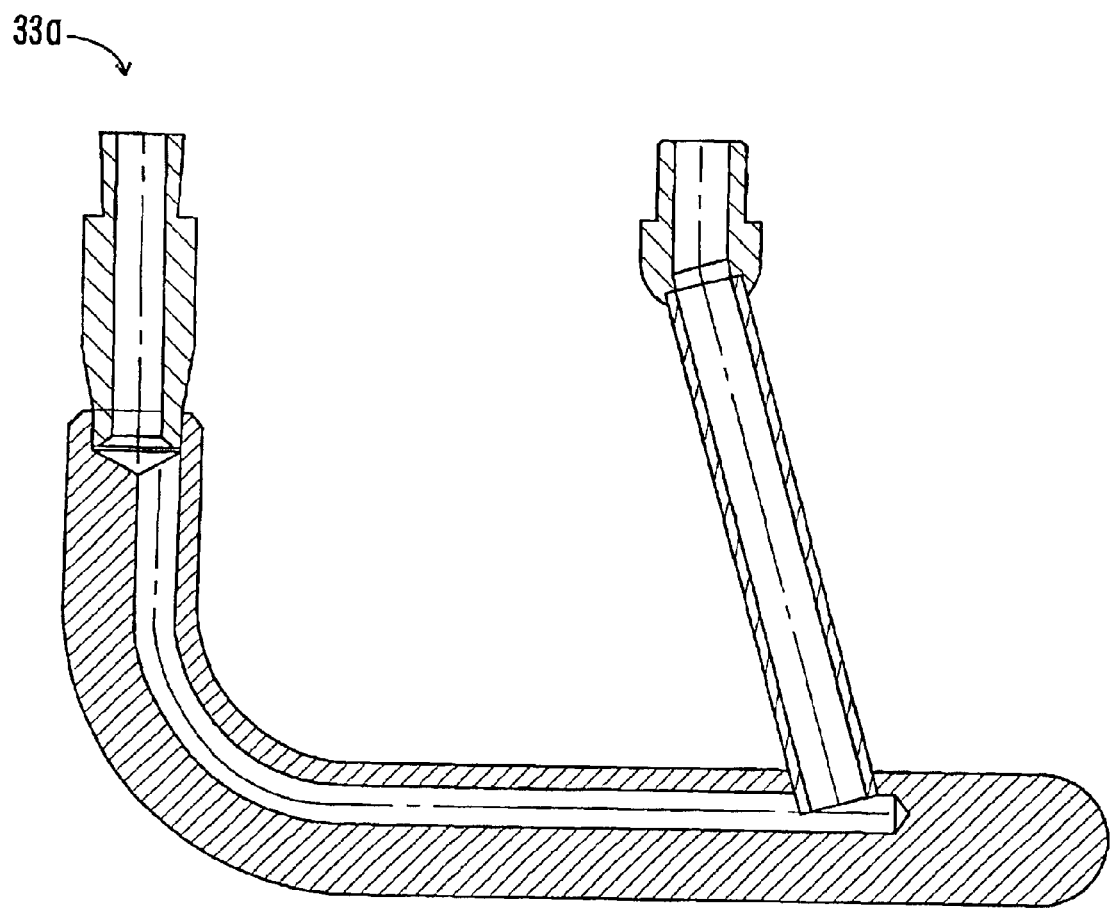
FIG. 3 is an enlarged side view of one of the primary electrodes, 33a, used in the plasma generator of FIG. 2.

Three primary electrodes 33a, 33b, and 33c (not shown) are circumferentially positioned around the chamber 40 (see also FIG. 3). Each electrode is positioned adjacent each other electrode such that narrow gaps are formed between each electrode adjacent to the end wall of the housing 31. The other end of each electrode extends laterally toward the faceplate 32 such that the gap between each electrode increases when moving toward the faceplate 32.

Each of the electrodes 33a–c are adjustably connected to the housing 31 using an electrode adjustment assembly. Each electrode adjustment assembly is independently adjustable to ensure that the narrow gap between each electrode remains substantially constant.

One such electrode adjustment assembly is shown in FIG. 2. The electrode adjustment assembly 50 includes a dielectric plate 52 connected to electrode holders 54 and 56 of electrode 33a. The dielectric plate is generally a thin rectangular sheet of metal having a threaded hole 58 (not shown) in the middle thereof. A bolt 60 passes through the threaded hole 58 (not shown) and is rotatably attached to the housing 31. Similar electrode adjustment assemblies (not shown) are used to connect electrodes 33b and 33c.

The electrodes 33a–c are powered directly through reactors 17a, 17b, and 17c (FIG. 1) which, in turn are connected to separate phases of the 480 VAC three-phase supply by a contactor 22 (FIG. 1). Preferably, the electrodes 33a, b, and c are hollow copper tubes so that they can be cooled internally by stream routed through cooling stream hose 44 from cooling stream manifold 20 (FIG. 1). Insulators 36 attach electrodes 33a to the housing 31 (FIG. 1).

Looking again at FIG. 2, three annular pneumatic rings 35a, b, and c are welded inside housing 31. Ring 35a is adjacent the end wall of the chamber 31 and introduces the working stream into the chamber 40 intermediate the end wall and the working area of the electrodes 33a, b, and c. Ring 35b is positioned intermediate ring 35a and the faceplate 32, and supplies the majority of the working stream to chamber 40. Ring 35c is positioned intermediate ring 35b and the faceplate 32. Utilization of three separate rings substantially improves plasma dynamics within the chamber. Furthermore, each ring can be used to introduce a different working stream into the chamber 40.

The working stream enters the chamber 40 through concentric holes in rings 35a, b, and c. Preferably the holes (not shown) are drilled tangentially so that the working stream is directed to flow in a clockwise direction to create a highly turbulent stream flow. The resulting flow creates a thin layer of non-ionized stream along the inner walls of the chamber 40. Tis layer provides thermal protection of the walls and minimizes the tendency of arcing between ends of the electrodes 33a–c and chamber 40.

In a preferred embodiment, the ring 35a is approximately 5.6 inches in diameter with six 0.1 inch diameter holes, ring 35b is approximately 10 inches in diameter with twelve 0.1 inch diameter holes, and ring 35c is approximately 12.4 inches in diameter with six 0.1 inch diameter holes. The holes are formed and positioned to create the tangential air injection as close as possible to the back wall of chamber 40 so that the stream reaches the electrodes 33a–c before the point where the arc is initiated. This arrangement also allows the stream to blow around the three electrodes 33a–c evenly from all sides.

Figure 4:
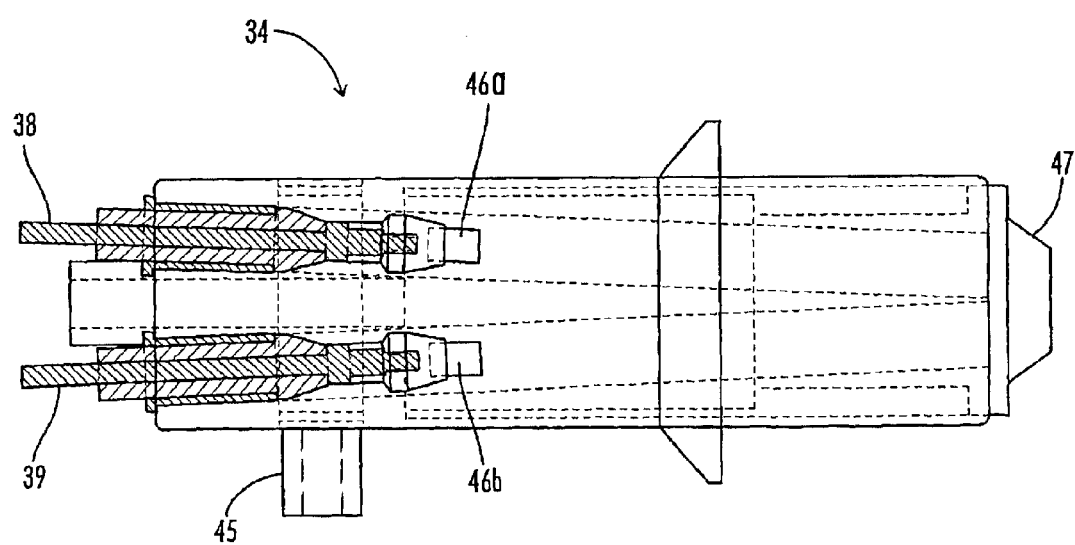
FIG. 4 is an enlarged cutaway side view of the high voltage plasma injector used in the plasma generator of FIG. 2.

To initiate an arc from the primary electrodes 33a–c inside chamber 40 at relatively low voltages (220–480 VAC), highly ionized stream generated by the high-voltage plasma injector 34 is introduced into the gap between electrodes 33a, b, and c. To obtain the highly ionized stream, injector stream is injected into injector 34 through the stream input 45, passing adjacent injector electrodes 46a and 46b (FIG. 4).

A high voltage arc is initiated between the injector electrodes 46a and 46b. The high voltage arc extends from the tip of injector electrode 46a through injector nozzle 47 and out of the injector 34, and returns into the injector 34 by passing back through injector nozzle 47 to the tip of injector electrode 46b. The distance at which this high voltage arc extends beyond the nozzle 47 can be increased by increasing the input stream and can be decreased by decreasing the input stream. The greater the distance that the high voltage arc extends out of the injector 34, the more stable the high voltage arc. This stability is due to the increased current required for a longer arc.

The injector stream is supplied through injector stream manifold 19 (FIG. 1). The high voltage arc between the injector electrodes 46a and 46b causes ionized injector stream to be expelled out of injector nozzle 47 and toward primary electrodes 33a, b, and c. The presence of the ionized stream causes a breakdown in the gap between the primary electrodes 33a–c. The resulting primary arc immediately begins to move along the electrodes 33a–c due to electrodynamic movement of the arc in the magnetic field created by its own current (rail gun effect).

The working stream, introduced through the pneumatic rings 35a–c from working stream manifold 18 (FIG. 2), is then superheated by the arc into thermal plasma. Rail gun effect causes the arc to move rapidly along the electrodes 33a–c, distributing the heat load. This heat distribution, along with internal stream cooling, allows the use of materials for electrodes 33a–c having a relatively low melting point but high thermal conductivity, such as copper alloys.

Due to the connection of each primary electrode 33a, b, and c to a separate phase of the supply voltage, an arc exists continuously inside the chamber 40, with each arc being 60 degrees out of phase as compared to its preceding or succeeding arc. As each are moves along its corresponding electrode 38a, b, and c, its length increases, causing the arc voltage to increase. As soon as the voltage reaches the magnitude of the breakdown voltage of the inner-electrode gap in its narrowest place, secondary breakdown takes place and the arc becomes self-sustaining. That is, it continues in chamber 40 beyond the region of injector stream ionization. This region is filled with the working stream. The working stream is heated by the arc and itself ionizes, contributing to conductance within the arc and allowing it to progress further along the electrodes 33a–c. Eventually the gap dimensions become too large to sustain the arc and the arc is extinguished. A new arc is simultaneously established at the narrow gap of two adjacent electrodes as the voltage increases between the adjacent pair of electrodes.

This process is repeated 120 times a second. The velocity of the arc is dependent on the diverging angle between the electrodes 33a–c and the magnitude of the arc current. Based on actual measurements of arc velocity along the electrodes 33a–c, as the current increases from 150 to 850 amps, the overall velocity changes from 10 m/sec to 25 m/sec.

The arc's actual velocity for a given operating current decreases noticeably as the arc moves along the electrodes 33a–c. This is due to the Angle A (FIG. 2) between the electrodes 33a–c and can be explained by the quadratic decrease of the magnetic field associated with the arc current and with the increase in distance between electrodes 33a, b, and c at the point of the arc. The optimum electrode angle A (FIG. 2) is in part a function of the operating power output of the system 10, as well as the type and flow rate of the working stream. In a preferred embodiment of the system 10, when operating at different power outputs in order to achieve the longest electrode lifetime, the electrode angle will be adjusted between 10 to 170 degrees. The arc-working area of the electrodes 33a–c is approximately 18 cm The pneumatic rings, 35a–c, through which the working stream is introduced, form a whirling stream that fans the arc further, lengthening it to increase arc voltage drop. At the same time, the incoming stream forms a cold layer near the inner walls of chamber 40 which protects the walls from the intense heat and minimizes the arcing to the chamber shell. Thus, power, stream temperature, and plasma generator efficiency can be adjusted by changing the working stream flow distribution of rings 35a–c.

The tangential introduction of stream into the plasma generator chamber 40 at an optimal position as described earlier in reference to the electrodes 33a–c allows the use of a chamber 40 having a shape that is close to spherical. This spherical chamber design results in a more efficient heating of the working stream and better cooling of the chamber walls. The working stream is injected in a way so that it tends to force the plasma away from the walls of the chamber. The optimum working stream flow rate is between 30 and 100 SCFM.

The system 10 will work with virtually any pure stream, stream mixture, or complex stream compound. An oxidizing atmosphere can be created using air or oxygen, a reducing atmosphere can be created using hydrogen or methane, and a neutral atmosphere can be created using nitrogen, helium, or argon. The above is not an exhaustive list of compounds which may be used to produce a given atmosphere. In addition, the working stream may comprise organic compounds, inorganic compounds, or mixtures of organic and inorganic compounds.

The design of the thermal plasma generator power supply allows it to operate using a common industrial power source (380–480 VAC, 3-phase). The current-limiting reactors 17a–c (FIG. 1) should be equipped with taps which allow regulated current selection, resulting in regulation of the plasma generator operating power. In one embodiment of the system 10, the taps on reactors 17a–c allow electrode current selection from 100 A to 1500 A.

Depending on the requirements of the higher operational power system, a larger system may be designed by configuring several thermal plasma generators into a single large volume reactor chamber.

The control circuits 15 (FIG. 1) provide power, temperature, and stream flow rate regulation, sets the control parameters for thermal plasma generator operation and provide for automatic shutdown if the parameters are exceeded.

Figure 5:
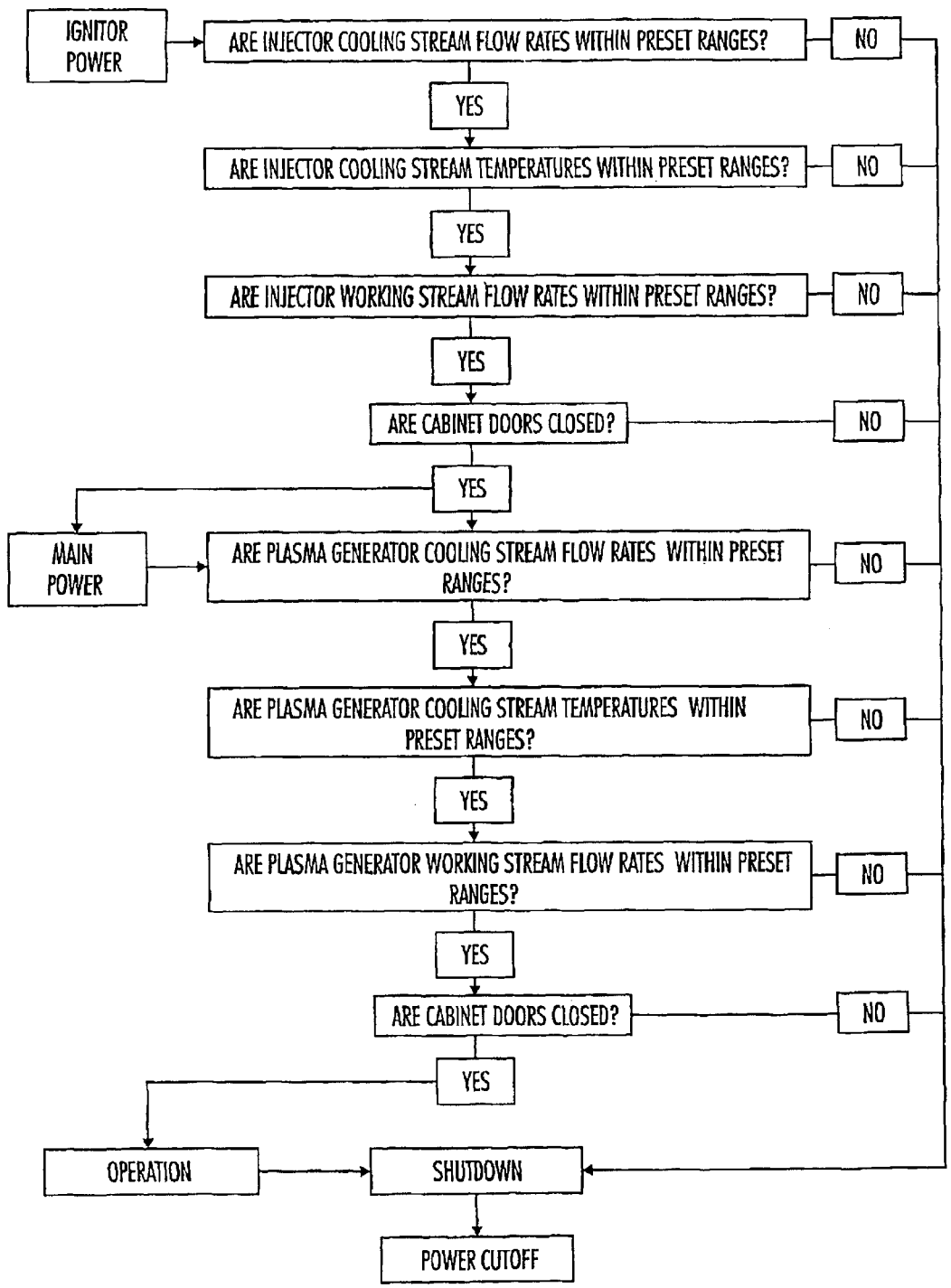
FIG. 5 is a flowchart illustrating the control sequence of a preferred embodiment of the control circuits.

One embodiment of the control sequence performed by the control circuits 16 is shown in FIG. 5. The control circuits 16 determine if the cooling stream flow rates, the cooling stream temperatures, and the working stream flow rates to the injector 34 are within preset ranges. If the cooling stream temperature exceeds 150 degrees Fahrenheit, the system will automatically shut down. If the flow rates are out of range, then the control circuits 15 prevent power from reaching the injector 34 and the system is shut down.

If the cooling stream flow rates, cooling stream temperatures, and working stream flow rates to the injector 34 are within preset ranges, then the control circuits 15 supply power to the injector 34.

The control circuits 15 then determine if the cooling stream flow rates, cooling stream temperatures and working stream flow rates to the plasma generator 30 are within preset ranges. If the cooling stream temperature exceeds 150 degrees Fahrenheit, the system will automatically shut down. If the flow rates are out of range, then the control circuits 15 prevent power from reaching the primary electrodes 33a–c in the plasma generator 30 and the system 10 is shut down.

If the cooling stream flow rates, cooling stream temperatures, and working stream flow rates to the plasma generator 30 are within preset ranges, then the control circuits 15 supply power to the primary electrodes 33a–c and thermal plasma generation is initiated.

The control circuits 15 also determines whether the phase currents (not shown) in each primary reactor are within preset ranges. The phase currents will be different for different plasma generator power settings.

The control circuits 15 will also shut down the system 10 if the doors on any of the system cabinets are open.

Because of the novel design of the thermal plasma generator system 10, the system 10 described is able to use almost any stream as the working stream during the thermal plasma generation process. Prior art AC thermal plasma generating systems cannot perform certain tasks because of their inherent instability and because they require a clean or even pure or noble working stream. For example, this system can destroy freon gas, nerve gases, and other military, toxic, and contaminant gases which would be harmful to the environment if released. Because the gas to be treated is also the working stream for the plasma system, there is no requirement for a treatment chamber that is inefficient and can produce less than one hundred percent (100%) material destruction.

The thermal plasma generator described in this invention can also destroy in the chamber aerosols of either a powdered solid or liquid that are introduced into the working stream flow. Accordingly, this thermal plasma generator system can be used to destroy illegal drugs, PCB laden transmission oils, or almost any other solid or liquid that can be converted into an aerosol. Other applications of this thermal plasma generator include the clean up of soil contaminated by organic contaminants of the type seen in gasoline spills and the destruction of sludge that may be too contaminated to dispose of in a conventional manner.

Thus, although there have been described particular embodiments of the present invention of a new and useful Three-Phase Alternating Current Thermal Plasma Generator With Extended Life Electrodes and Multiple Stream Injector Rings, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What is claimed is:

1. A thermal plasma generator comprising:
    a plasma generator unit having a housing, an arcing chamber inside the housing, first, second, and third primary electrodes spaced around the inside of the housing to define an arcing region between the primary electrodes within the arcing chamber, and an opening at one end of the housing for exhausting the plasma stream;
    power supply means to connect each of the first, second, and third primary electrodes to a separate phase of a three-phase alternating current supply voltage;
    adjustment means connected to each of the first, second, and third primary electrodes for adjusting each of the first, second, and third primary electrodes with respect to each other in order to form a predetermined gap between each of the electrodes;
    injector means to inject an ionized stream into the arcing region;
    working stream supply means to deliver and distribute a working stream into the chamber, the working stream supply means including a plurality of annular pneumatic rings attached to the housing inside the chamber, the rings attached to an external source of the working stream, and the rings including a plurality of vent holes through which the working stream can pass from within the rings into the chamber; and
    control unit means to control the thermal plasma generator unit, the power supply means, the injector means, and the working stream supply means.

2. The system of claim 1, wherein the supply voltage is between 220 and 480 volts.

3. The system of claim 2, wherein the injector means comprises a single-phase AC plasma generator attached to the housing and wherein the system further comprises injector stream means to deliver injector stream into the injector means.

4. The system of claim 3, further comprising reactor means to regulate the current to the first, second, and third primary electrodes.

5. The system of claim 4, wherein the housing includes an integral stream jacket and the system further comprising cooling stream supply means to circulate cooling stream through the stream jacket.

6. The system of claim 5, wherein the first, second, and third primary electrodes comprise hollow tubes and the cooling stream supply means includes means to circulate the cooling stream through the tubes.

7. The system of claim 1 wherein a first pneumatic ring is proximate a back wall of the chamber, a second pneumatic ring is intermediate the back wall of the chamber and the opening, and a third pneumatic ring is proximate the opening.

8. The system of claim 7 wherein the holes in the pneumatic rings are each arranged and oriented so as to direct the working stream in a consistent swirling rotation to create a turbulent flow of working stream within the arcing chamber.

9. The system of claim 8 wherein the arcing chamber is substantially spherical in shape.

10. The system of claim 8 wherein the arcing chamber is substantially cylindrical in shape having a first cone at a first end and a second cone at a second end, said first cone having a discharge orifice.

11. The system of claim 9 wherein holes in the ring are tangentially oriented with respect to the ring to direct the working stream proximate a back wall of the chamber.

12. The system of claim 1 wherein each primary electrode forms an angle ranging from 10 to 170 degrees relative to each other primary electrode.

13. The system of claim 12, wherein the primary electrodes are independently adjustable relative to each other.

14. The system of claim 13, wherein the primary electrodes have a thickness ranging from approximately 1–3 centimeters.

15. The system of claim 13, wherein the primary electrodes have a thickness ranging from approximately 3–6 centimeters.

16. A thermal plasma generator system comprising:
    a plasma generator unit having three adjustable primary electrodes, each of the electrodes connected to one phase of a three phase AC supply voltage;

means for adjusting the three primary electrodes with respect to each other in order to form a predetermined gap between each of the electrodes;

an injector unit including a pair of electrodes inside the injector, the electrodes connected to a single phase AC supply voltage, and means for injecting an injector stream inside the injector;

means for injecting and distributing a working stream inside the plasma generator unit near the primary electrodes; and means for cooling the plasma generator unit.

17. The system of claim 16, further comprising means to cool the primary electrodes.

18. A method of generating a stream of high temperature gas, comprising the steps of:
 a. applying an AC supply voltage between adjustable primary electrodes inside a single arcing chamber, the adjustable electrodes arranged with respect to each other such that a predetermined gap exists between each of the electrodes;
 b. injecting and distributing a working stream into the arcing chamber using multiple pneumatic rings;
 c. arranging the arcing chamber and primary electrodes such that the application of the supply voltage across the primary electrodes generates an arc that moves along the electrodes as a consequence of a magnetic field produced by the arc current and such that the moving arc heats and ionizes the working stream, causing the working stream to be expelled from the chamber.

19. The method of claim 18, wherein the adjustable primary electrodes comprise three primary electrodes, the AC supply voltage is three-phase, and each primary electrode is connected to a separate phase of the supply voltage.

20. The method of claim 18, further comprising the step of injecting an ionized injector stream into the arcing chamber proximate the primary electrodes.

21. The method of claim 18, wherein the working stream is injected through holes in the pneumatic rings inside the arcing chamber.

22. A thermal plasma generator comprising:
 a plasma generator unit having a housing, an arcing chamber inside the housing, an opening at one end of the housing for exhausting the plasma stream, first, second, and third primary electrodes spaced around the inside of the housing and extending toward the opening to define an arcing region between the electrodes within the arcing chamber, said first electrode having a first end adjacent a first end of said second and third electrode, forming a narrow gap, and said first electrode having a second end adjacent a second end of said second and third electrode, forming a gap wider than said narrow gap;
 means connected to each of the first, second, and third primary electrodes for adjusting each of the first, second, and third primary electrodes with respect to each other in order to form a predetermined gap between each of the electrodes;

power supply means to connect each of the first, second, and third primary electrodes to a separate phase of a three-phase alternating current supply voltage;

injector means to inject an ionized stream into the arcing region;

working stream supply means to deliver and distribute a working stream into the chamber, the working stream supply means comprising multiple pneumatic rings connected inside the chamber; and control unit means to control the plasma generator unit, the power supply means, the injector means, and the working stream supply means.

23. The system of claim 22, wherein the working stream supply means supplies more than one type of working stream.

24. The system of claim 22, wherein the primary electrodes have predetermined arc working areas and the predetermined arc working areas are greater than 7 centimeters.

25. The system of claim 22, wherein the primary electrodes have predetermined arc working areas and the predetermined arc working areas are approximately 18 centimeters.

26. The system of claim 1, wherein the primary electrodes have predetermined arc working areas and the predetermined arc working areas are greater than 7 centimeters.

27. The system of claim 1, wherein the primary electrodes have predetermined arc working areas and the predetermined arc working areas are approximately 18 centimeters.

28. The system of claim 1, wherein the working stream supply means supplies more than one type of working stream.

29. The system of claim 16, wherein the means for injecting a working stream comprises a means for injecting more than one type of working stream.

30. The system of claim 16, wherein the primary electrodes have predetermined arc working areas and the predetermined arc working areas are greater than 7 centimeters.

31. The system of claim 16, wherein the primary electrodes have predetermined arc working areas and the predetermined arc working areas are approximately 18 centimeters.

32. The method of claim 18, wherein the step of injecting a working stream comprises the step of injecting more than one working stream.

33. The method of claim 18, wherein the primary electrodes have predetermined arc working areas and the predetermined arc working areas are greater than 7 centimeters.

34. The method of claim 18, wherein the primary electrodes have predetermined arc working areas and the predetermined arc working areas are approximately 18 centimeters.

* * * * *